United States Patent [19]
Montgomery et al.

[11] Patent Number: 5,781,620
[45] Date of Patent: Jul. 14, 1998

[54] METHOD AND SYSTEM FOR TOLL CARRIER SELECTION

[75] Inventors: Robert H. Montgomery, Herndon, Va.; Gary Sacra, Baltimore, Md.; Audrey Renee Taylor, Arlington, Va.

[73] Assignee: Bell Atlantic Network Services, Inc., Arlington, Va.

[21] Appl. No.: 504,377

[22] Filed: Jul. 19, 1995

[51] Int. Cl.[6] .................................................. H04M 15/00
[52] U.S. Cl. ...................... 379/115; 379/112; 379/115; 379/220; 379/229
[58] Field of Search ............... 379/112–115, 118, 379/130, 201–202, 207, 220–221, 229–230, 111, 127, 269

[56] References Cited

U.S. PATENT DOCUMENTS

| | | | |
|---|---|---|---|
| 4,191,860 | 3/1980 | Weber | 179/18 B |
| 4,565,903 | 1/1986 | Riley | 179/18 B |
| 4,611,094 | 9/1986 | Asmuth et al. | 179/7.1 TP |
| 4,685,127 | 8/1987 | Miller et al. | 379/221 |
| 4,769,834 | 9/1988 | Billinger et al. | 379/112 |
| 4,791,665 | 12/1988 | Bogart et al. | 379/207 |
| 4,866,763 | 9/1989 | Copper et al. | 379/21 |
| 4,972,464 | 11/1990 | Webb et al. | 379/112 |
| 5,056,134 | 10/1991 | Bauer et al. | 379/246 |
| 5,206,899 | 4/1993 | Gupta et al. | 379/120 |
| 5,206,901 | 4/1993 | Harlow et al. | 379/211 |
| 5,208,848 | 5/1993 | Pula | 379/67 |
| 5,212,727 | 5/1993 | Ramkumar | 379/221 |
| 5,247,571 | 9/1993 | Kay et al. | 379/207 |
| 5,259,026 | 11/1993 | Johnson | 379/207 |
| 5,408,526 | 4/1995 | McFarland et al. | 379/114 |
| 5,515,425 | 5/1996 | Penzias et al. | 379/114 |
| 5,530,741 | 6/1996 | Rubin | 379/201 |
| 5,550,910 | 8/1996 | DeJager | 379/115 |
| 5,583,926 | 12/1996 | Venier et al. | 379/229 |

*Primary Examiner*—Curtis Kuntz
*Assistant Examiner*—Binh K. Tieu
*Attorney, Agent, or Firm*—Lowe, Price, LeBlanc & Becker

[57] ABSTRACT

The invention provides a method for automatically selecting a carrier network from a plurality of available networks to carry a telephone call (including MTS, video, data, etc.) for which toll charges are to be levied. The selection is made as a function of the call-type, and the method may be used, for example, to select a carrier, pre-subscribed to by a subscriber, for intra-LATA toll calls, inter-LATA and international calls. Alternatively, within a call-type, a carrier may be selected on the basis of toll rates, either on a per-call basis or by pre-subscription. A receiving end-office receiving a call from a calling station determines call-type and accesses a database whose contents either produce the identity of a preferred carrier for the call-type or the identity of the carrier having the lowest toll rate for the call. In any case, the identity of the carrier is returned from the database to the end-office and the end-office switch acts to connect the call to that carrier's network.

11 Claims, 4 Drawing Sheets

METHOD AND SYSTEM FOR TOLL CARRIER SELECTION

TECHNICAL FIELD

This invention, arising in the field of telecommunications, pertains generally to a method and system for selection of a carrier for telephone toll calls, and particularly to a method and system whereby toll carrier selection is made automatically on a call-by-call basis as a function of, among other things, the type of call being placed.

BACKGROUND ART

For certain telephone calls—generally those that progress beyond the local exchange—a telephone toll charge is typically levied on a per call basis.

In the United States, where, for telephone purposes, the country is geographically divided into contiguous, non-overlapping local access transport areas (LATAs), all inter-LATA calls (e.g., "long distance" calls) and certain calls that remain intra-LATA are subject to toll charges by the carriers for the calls. Intra-LATA calls that are handled entirely within a local telephone exchange (i.e., those that are both originated and terminated by the local exchange) are not subject to toll charges.

In the usual scheme of things, every telephone call is initially handled by a central office of a local exchange company, regardless of whether the call is inter-LATA, intra-LATA, or bound for an international destination. If the call destination requires inter-LATA routing, then, in the vast majority of cases, it will ultimately be handed over to an inter-exchange carrier (an "IXC") for routing to the destination local exchange that serves the telephone station being called. The IXC makes a toll charge for carrying the call. A similar practice prevails for international calls.

For intra-LATA toll calls, however, the usual practice is somewhat different. Although the call is a toll call it will rarely be handed off to another carrier for completion, but rather it will be carried to its destination by the operating company having responsibility for the local exchange. This is so even though the call is routed from one local exchange to another.

For inter-LATA and international calls, there is vigorous competition among the inter-exchange carriers to become the carrier of choice for telephone customers. The customers making these calls have a number of ways by which their choice of carriers can be exercised. For one, a customer (or subscriber) may pre-subscribe to the services of a toll carrier so that inter-LATA and international calls placed from the subscriber's station are automatically connected by the local exchange company to the carrier of choice. This is an "equal access" type of service. For implementation in most cases (there are some exceptions, as will be noted), a leading "1" dialed from the subscriber's station is the signal to the local central office that the call is long distance and is to be carried by the carrier pre-subscribed to.

Alternatively, an inter-LATA toll carrier can be selected on a per call basis by use of an access code which identifies the selected carrier and which is entered from the calling station when the call is placed. For example, even if a calling station is pre-subscribed for a particular carrier, another one can be selected by dialing, before the usual ten digit number, an access code in a prescribed format, where some of the digits are the code for a particular carrier. Entry of the access code will override the pre-subscription, and place the call with the toll carrier requested for that call.

By contrast, pre-subscription, or equal access, for intra-LATA toll calls is only now beginning to be considered and implemented, and by default those calls are now almost universally carried by the local exchange companies that receive them in the first instance. In certain jurisdictions, however, it is mandated (on a state-by-state basis) that callers be enabled to select an intra-LATA toll carrier on a call-by-call basis by entry of an access code as is now done for inter-LATA calls.

Further, it is expected that "equal access" will increasingly be mandated for intra-LATA toll calls in the various regulatory jurisdictions. That is, it will be required that telephone subscribers be able to pre-subscribe to a carrier of their choice for intra-LATA toll calls as they now do for inter-LATA calls. For intra-LATA equal access it is expected that there will be no requirement that a single carrier provide both services. In other words, the customer may pre-subscribe to one carrier for inter-LATA service and to another carrier for intra-LATA service. Furthermore, within this operating framework it becomes desirable for a subscribing customer to be able to pre-subscribe for carrier selection based not only on an inter-LATA/intra-LATA toll characterization but on certain other factors as well. For example, it is desirable to be able to have a toll carrier automatically selected based on such considerations as the class of service (e.g., switched digital services, video, etc.), the time of day and day of the week that a call arises, and so forth.

While equal access for intra-LATA calls will undoubtedly be of economic benefit to telephone customers and will likely lead to the same fierce competition that is now waged for inter-LATA and international customers, its introduction raises certain problems.

Among other things, it is desirable to be able to implement intra-LATA equal access without having to impose major architectural changes on the call processing framework of the telephone system, and such that users of the telephone system continue to be able to place calls as they do today. It should not be required, for example, that intra-LATA toll calls be dialed any differently than they are now. Thus, from one view there is the problem of recognizing that a call is an equal access intra-LATA toll call and of finding the appropriate carrier to connect the call to, while, at the same time, appropriately recognizing and routing equal access inter-LATA calls. This should be done without overhauling the system's structure and with transparency to telephone system users.

From another view there is a problem with customer confusion. For equal access as it is now implemented, the competing carriers offer a plethora of calling plans at various toll rates. These vary from carrier to carrier and may depend on a number of factors, including the class of service, the time of day for a call, the day of the week, the area code being addressed, and even the particular phone number being called. With expansion to intra-LATA equal access the number of potential carriers for that service will be greater since, among other things, those regional operating companies who are barred from inter-LATA competition will become competitors for the intra-LATA toll calls that they now largely handle by default. This is likely to result in even greater confusion since there will be a need on the part of consumers to perceive, some distinction in the services and to select from an even greater number of options. Thus, while equal access for intra-LATA toll calling will provide the consuming public with even more choices for their telephone services and may even result in lower charges, in any final analysis it is the latter which is of real interest to the consumer in most cases.

Broadly, the present invention seeks solutions to these and other problems that arise from a more universal equal access service.

A particular object is to provide a method for operating a telephone system which will allow a customer to pre-subscribe to preferred carriers for intra-LATA toll, inter-LATA and international calls and which, upon placement of a call, will discern the call-type and automatically select the carrier of choice. This is sought to be done, not by substantial changes to the presently used telephone system architectural structure, but rather by building upon what is there so that users proceed in ways that are familiar to them.

Another objective is to provide a more universal equal access system, operative in an environment of multiple toll rates, which will allow consumers to pre-subscribe for preferred carriers but by which the consumer may alternatively elect to have calls—on a call-by-call basis—automatically placed with the carrier whose toll rates are lowest for any given call. Desirably, such automatic least cost routing will be either by pre-subscription or such that a user placing a call can command least cost routing in preference to pre-subscribed carriers.

Furthermore, it is an object of the invention that it accommodate a feature whereby a call is placed with a toll carrier only if the call is acceptable to the carrier, and conversely, for least cost routing, that a selected carrier be acceptable to the user prior to call connection to that carrier.

Still further, for preferred carrier pre-subscription, it is an object of the invention that carrier selection be adaptable to permit selection based on the class of service, time of day for the call, the day of the week, area code called, and other such criteria, including selection based on the called party's telephone number.

Certain known prior patents are of interest in considering these objectives and the attainments of the present invention. For example, others have dealt with issues relating to pre-subscription for the selection of inter-LATA carriers, even if not for selection of a mix of inter-LATA and intra-LATA toll carriers. These patents are briefly discussed here for background purposes, but as will be perceived, none of them deal precisely with the objectives of the present invention.

A patent to Riley, U.S. Pat. No. 4,565,903, for example, discloses selection of an inter-exchange carrier either by pre-subscription or by override of the pre-subscription. For pre-subscription, the subscriber line is pre-associated with a certain carrier; to override the pre-subscription, an access code for the selected carrier can be entered. Additionally, a default carrier can be specified if no primary carrier is specified.

Another patent, U.S. Pat. No. 4,769,834, to Billinger et al., deals with carrier selection via a facility's reseller telephone communication system (e.g., a PBX). With this system, the reseller facility is initially accessed and then the caller's automatic number identification (ANI), provided by the telephone company's central office, is used in place of an authorization code to access the ultimate carrier's facilities.

Somewhat similarly, U.S. Pat. No. 4,791,665 to Bogart et al., discloses a system which provides a PBX feature for selection of an inter-exchange carrier. A database in the main memory of the PBX contains a personal identification for each calling party served by the PBX and inter-exchange access code. When a call is originated to the PBX, the calling number, the time of day, and other factors are used to select an inter-exchange carrier and establish a call connection. It is suggested that routing may be selected on the most economical basis.

A patent to Cooper et al., U.S. Pat. No. 4,866,763, discloses a system that interacts with a telephone system user and allows the user to encode database messages enabling a local exchange switch to interconnect the user lines with inter-exchange carriers defined by the user-created database. The selection may prescribe preferred carriers by time of day and day of week.

DISCLOSURE OF THE INVENTION

Briefly described, the present invention attains the foregoing and other objectives in a method and system that automatically selects a toll carrier network to carry a toll call from the end-office of a local exchange. The carrier selection is made from a plurality of available carriers as a function of the type of call being made, and, in one aspect, as a function of a subscriber's pre-association of a preferred carrier with each call-type. Among the set of call-types are intra-LATA toll calls, inter-LATA, and international calls. A user may pre-subscribe for carrier selection based on call-type, or alternatively for carrier selection based on call-type with a least cost routing feature. In any case, least cost routing may be selected on a per call basis.

Operatively, information received at the end-office about the call is used to determine the call-type from the set of call-types. Call-type is, in most cases, discernible from dialed digits received from a calling station. A determination is also made at the end-office as to whether a request has been made for automatic selection of a toll carrier. Such a request may be in the form of pre-subscription of the calling station, or on a per call basis for least cost routing. Information, including that which is indicative of call-type, is forwarded to a database whose content relates call-type to toll carrier. The database contents provide the identity of a carrier to handle the call. That identity is sent to the end-office where it is used to cause connection of the call to the selected carrier network. In one form, the invention is characterized by the use of advanced intelligent networking facilities. Thus, in those terms, the above mentioned end-office is provisioned as a "service switching point" (SSP) and the database comprises an "integrated service control point" (ISCP).

BRIEF DESCRIPTION OF DRAWINGS

While the specification concludes with claims particularly pointing out and distinctly claiming the subject matter regarded as the invention, the invention will be better understood from the following description taken in connection with the accompanying drawings in which:

BEST MODE FOR CARRYING OUT THE INVENTION

The innovative method and system described here operates within the framework of what has come to be known as an advanced intelligent network (AIN). In an AIN type system, central offices having a service switching point (SSP) exchange data messages with an integrated services control point (ISCP) via a switching transfer point (STP) and interconnecting data links. At least some calls are then controlled through multiple central office switches using data retrieved from a database in the ISCP. An exhaustive description of an AIN system, suitable for implementation of the present invention, is provided in U.S. Pat. No. 5,247,571 to Kay and McConnell, the disclosure of which is incorporated herein by reference. The Kay and McConnell patent is assigned to the assignee of the present invention.

Figure 1:
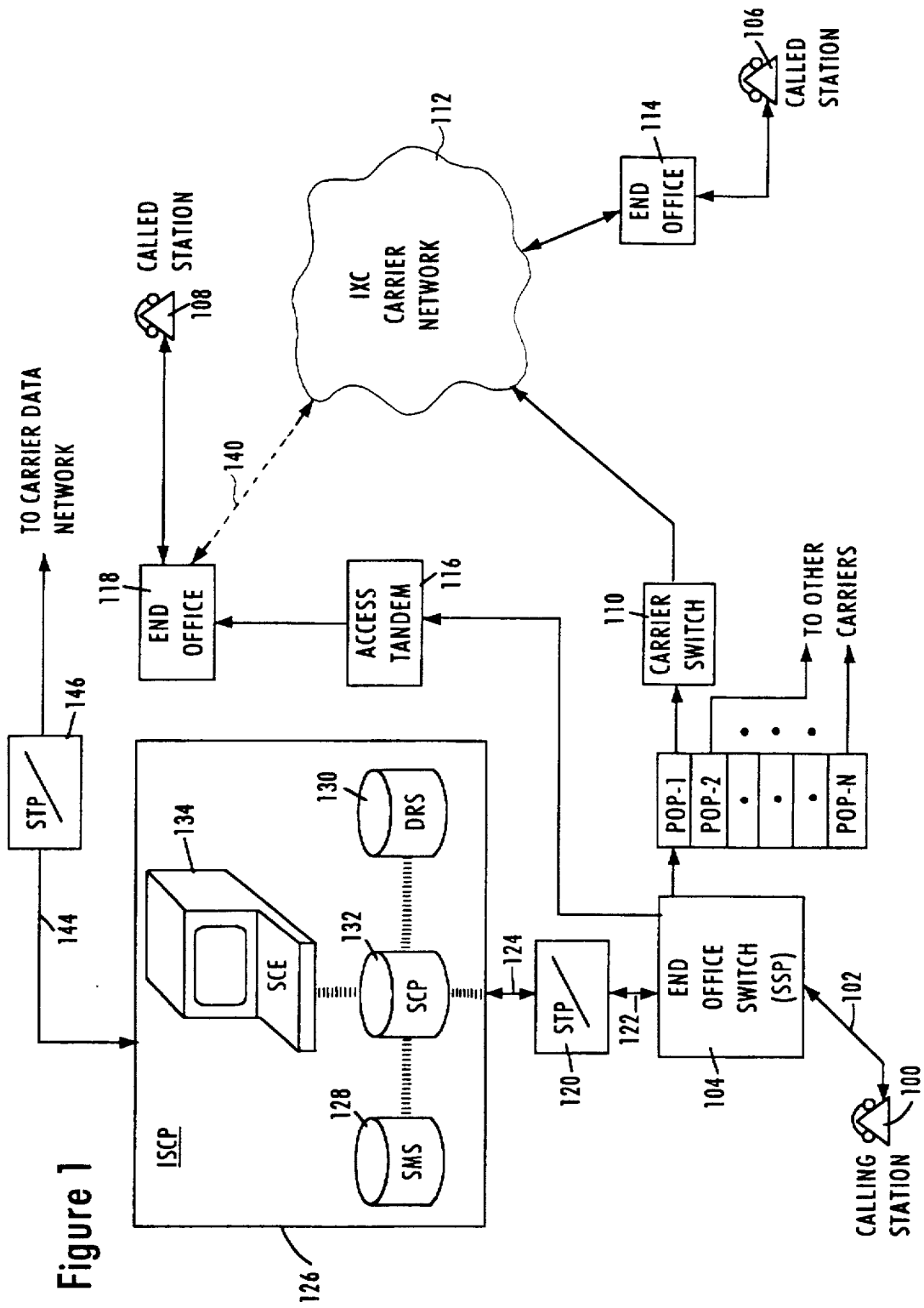
FIG. 1 is a block diagram schematically illustrating a telephone system in which the invention can be used and is referred to for a discussion of call routing and processing in accordance with the invention.

FIG. 1 is a block diagram of a telephone system, including components of an advanced intelligent network, which illustrates operation of the invention. It will be recognized, of course, that FIG. 1 is considerably simplified for explanation purposes and that the full network environment for the invention will comprise multiple end-offices, diverse inter-connections, and provisions for network reliability through redundancy, all of which need not be shown here.

Initially, for developing an understanding of the invention, it will be helpful to recall the conventional and current procedures for processing inter-LATA and intra-LATA toll calls.

In either of these cases, a call, assumed to originate at calling station 100, begins when the calling station goes off-hook indicating to the end-office switch 104 (via local loop 102) that a call is desired to be placed and that dialed input digits can be expected from the calling station. The end-office switch 104 will generally be located in a central office of a local telephone company. In the first case, for an inter-LATA call, it will be assumed that the call is to be placed to a called station 106 which may be geographically remote from the calling station 100; in the second case, for an intra-LATA toll call, it will be assumed that the call is to a called station 108 and will incur a toll charge even though stations 100 and 108 are within the same LATA.

If the call is an inter-LATA or international call it will ultimately have to be connected to the facilities of a long distance carrier. The need for this is perceived in end-office switch 104 by an analysis of the dialed digits received from the calling station 100. For an inter-LATA call, the dialed digits will typically have been correctly entered in one of several ways; that is, for example, a caller at station 100 either dials the 1+10-digit inter-LATA telephone number (i.e., 1+10D) or the access code of the particular long distance carrier desired to be used for the call. In the first case, the end-office switch 104, using the dialed "1" and as many of the following ten digits as necessary, recognizes the call as being inter-LATA and associates the calling line 102 (from the line coding) with a particular long distance carrier that has been pre-selected by the subscriber for the calling line 102. The association of carrier with the calling line 102 is stored for access in translation tables contained in the memory (not specifically illustrated) of end-office switch 104. In the second case, the switch 104 simply recognizes the dialed carrier access code, also from a stored association. The access code is generally in the form of either 10XXX or 10XXXX, where X is any digit 0–9 and the Xs identify a particular carrier. The access code is an override that essentially compels connection of the call to the identified carrier. International calls from the United States are perceived by entry and receipt of the international access number 011. Notably, not all 1+10D numbers are inter-LATA, nor is it always necessary to precede a 10-digit number (i.e., a telephone number including the area code, or NPA) with the digit 1.

Once the switch 104 recognizes the call as inter-LATA and determines the appropriate carrier, it connects the call to the facilities of that carrier. This is done through a local "point-of-presence", or POP, maintained for that purpose by the inter-LATA carrier within the LATA of the end-office switch 1–4. In FIG. 1, the call is illustrated to be handed off to POP-1, ultimately passing then to the toll carrier's access switch 110, through that carrier's network 112, a destination end-office 114, and finally to the called station 106. A toll charge for the call is levied by the operating carrier of IXC network 112.

Multiple POPs, POPs 1–N, accommodate multiple carriers, each having a corresponding connection (through a trunk group, for example) to their own carrier switches and inter-exchange carrier network. These other carrier switches and networks are not specifically shown in FIG. 1. Thus the route to called station 106 could have been via an altogether different carrier, other than through carrier switch 110 and network 112.

By contrast, in the conventional practice for intra-LATA toll calls there is no need for carrier selection, and therefore there is no use of anything analogous to "dial 1" equal access. It may be noted, however, that intra-LATA toll calls can now be placed with an inter-exchange carrier by use of that carrier's access code (i.e., 10XXX or 10XXXX as mentioned above for inter-LATA calls). For example, an intra-LATA toll call from station 100 to station 108 can be made through the facilities of IXC carrier 112 by particularly dialing access to that carrier's facilities.

In the majority of cases an intra-LATA toll call begins with a caller at station 100, for example, dialing an ordinary 7 or 1+10-digit telephone number. The end-office switch 104, recognizing from the dialed digits that the call is neither local nor long distance and that no access codes have been entered, passes the call to an access tandem switch 116 and then to the end-office 118 that serves the call station 108. The access tandem 116 and the end-office 118 are part of the network operated by the local exchange carrier. That carrier levies the toll charge for carrying the call.

By the present invention, a method of equal access is implemented for both inter-LATA and intra-LATA calls. A feature of the invention is that equal access may be obtained not only to the facilities of pre subscribed carriers, but to those of the carriers having the lowest toll rates.

The architectural framework for this (also illustrated in FIG. 1) uses aspects of advanced intelligent networking. For that, the end-office switch 104 is an appropriately equipped programmable switch (denoted as a service switching point, or SSP) preprogrammed to recognize certain call related triggers that momentarily cause call processing in the switch to be suspended while access to an ISCP occurs.

The AIN components of interest, with reference to FIG. 1, include, first the end-office SSP 104, a switching transfer point (STP) 120 interconnected on one side to the SSP 104 via a data link connection 122 and on the other side via a data link 124 to the integrated service control point (ISCP) 126. The ISCP 126 is itself made up of a service management system (SMS) 128, a data and reporting system (DRS) 130, and a database or service control point (SCP) 132. The ISCP 126 also includes a terminal subsystem known as a service creation environment (S E) 134 for programming and changing the contents of the database 132.

For the present invention, the SCE 134, which is an established component of an operating ISCP, provides access to the AIN system and facilitates initial entry and updating of the identity of pre-subscribed carriers for a customer and the entry and updating of other information pertinent to routing of the call in accordance with the invention.

Figure 2A:
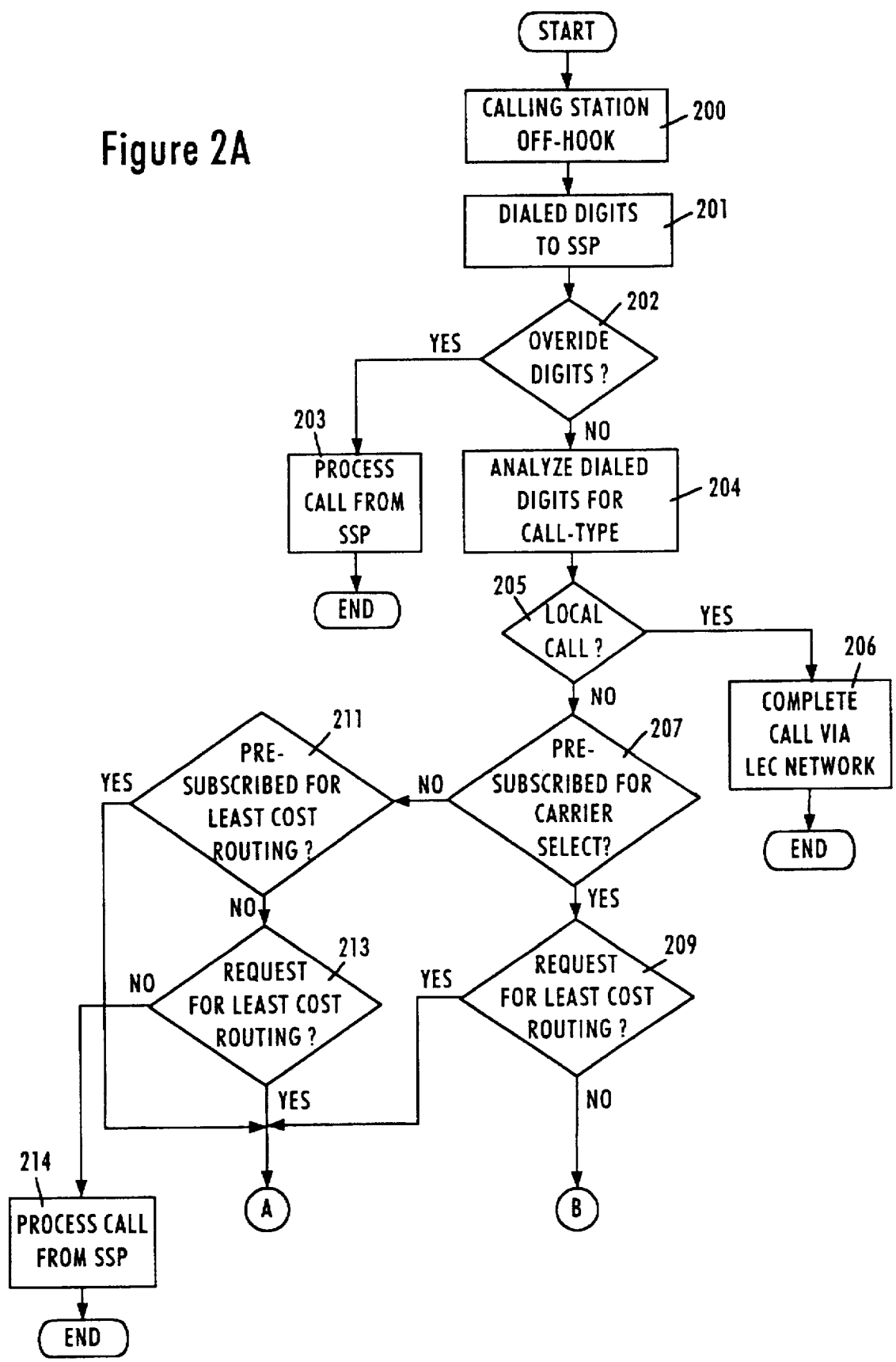
FIG. 2, consisting of FIGS. 2A, 2B, and 2C taken together, is a block flow chart illustrating the processing steps carried out in a preferred form of the invention.
Figure 2B:
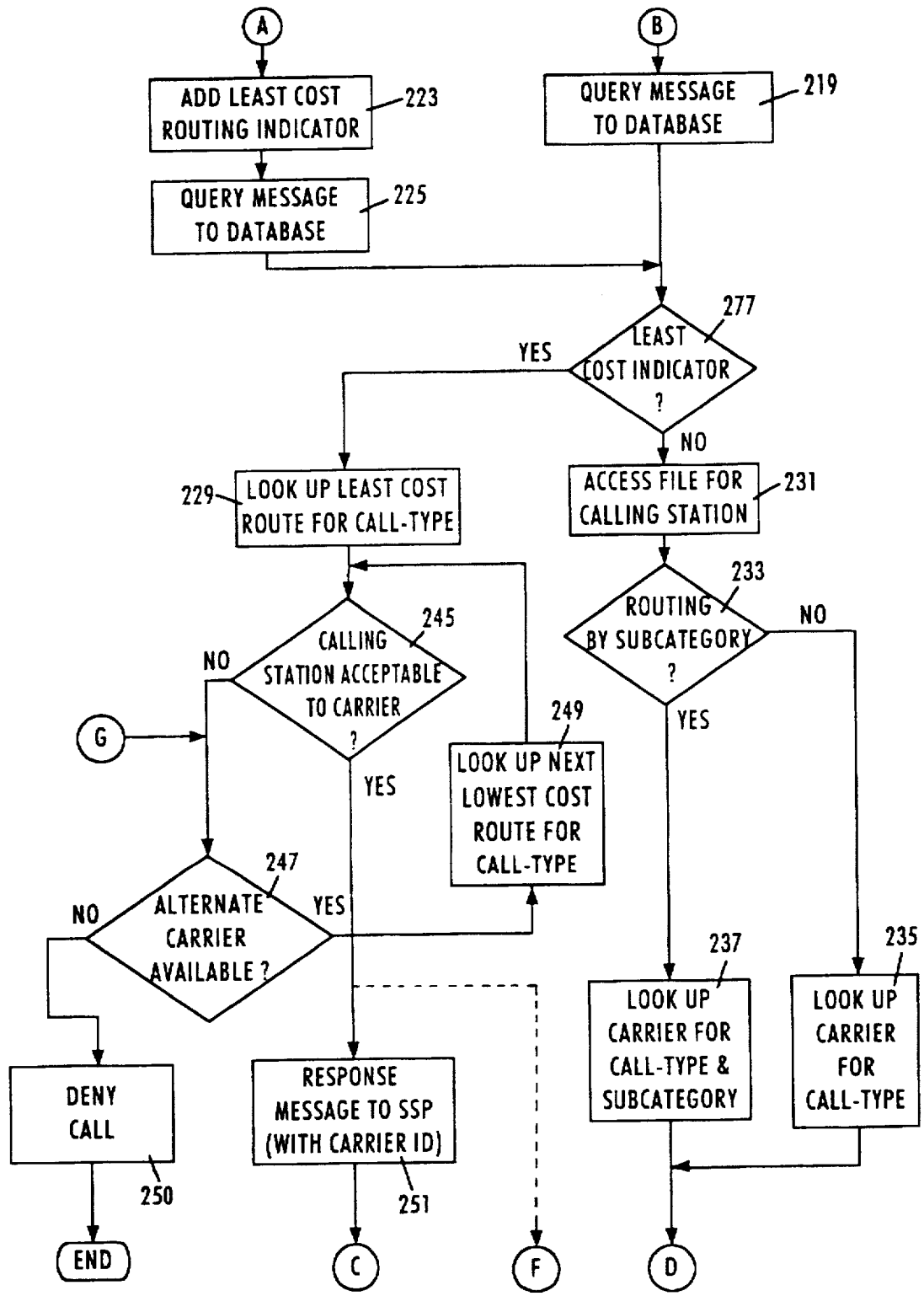
Figure 2C:
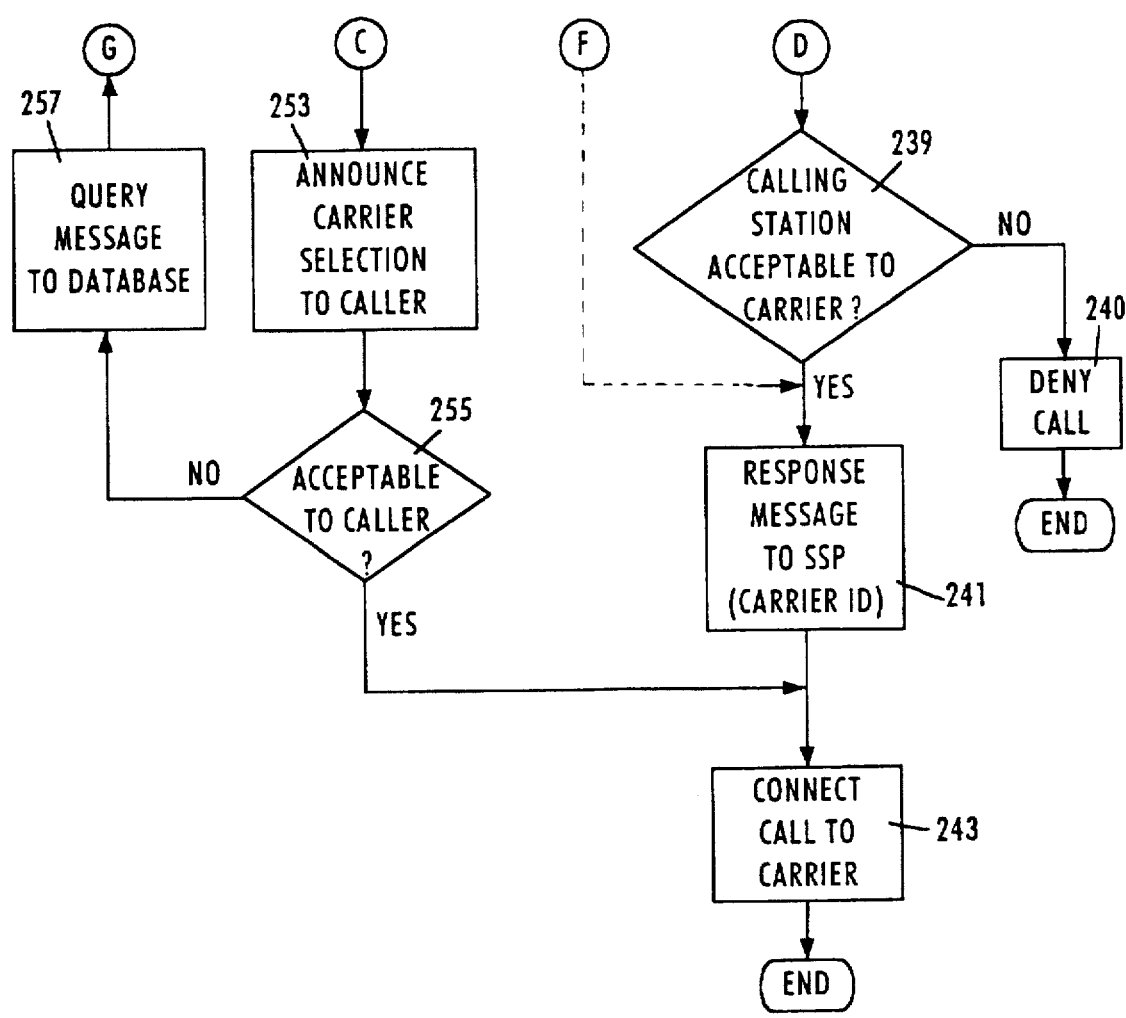

The block flow diagram of FIG. 2 (i.e., FIGS. 2A–2C, taken together), considered in connection with FIG. 1, details a process in accordance with the invention. Notably, however, FIG. 2 is in simplified form and a number of essentially routine steps, recognizable to those of skill in the art to be required, are omitted for the sake of brevity. It will also be recognized that while the steps are depicted more or less sequentially, sequential performance is not necessarily a requirement of the invention and those of skill in the art will also recognize that the order in which certain steps are performed will not be critical.

At the start of the process, at step 200, a calling station (Station 100, for example) goes off-hook signalling that a call is desired to be made. Although calling station 100 is illustrated in FIG. 1 as a telephone instrument, and although the discussion herein is generally in terms of calling and called stations, these designations are merely for convenience, and it is to be understood that the calling station 100 and any other stations discussed herein, including the various called stations, need not be limited to telephone instruments, per se. That is, for example, the calling and called stations may be facsimile machines, integrated service digital network (ISDN) sets, computers, videophones, and other such devices between which communications is to be established. Similarly, the telecommunications exchanged need not be limited to voice communications, but it may be in various forms and for various classes of service. In any case, dialed digits from the calling station 100 are forwarded over the line 102 to the end-office switch, SSP 104 (step 201). Since the feature of being able to access any carrier by use of a dialed access code remains operative in the context of the present invention, a determination is made at step 202 as to whether an access code (e.g., 10XXX, as mentioned above) has been entered. If so, that is taken as an override,to the process and there is a diversion to step 203 wherein the SSP 104 processes the call by connection to the selected carrier. This may be implemented conventionally as discussed above, and the call will, from that point, be handled by the selected carrier.

If, however, there is no such overt request for a particular carrier (i.e., there is a "No" response at step 202) the process continues at step 204 according to which the SSP 104 operates to collect and analyze the dialed digits provided as inputs from the calling station 100. The analysis results in a determination of the call-type. That is, the call is recognized as either (i) an intra-LATA toll call, (ii) an inter-LATA call, (iii) an international call, or (iv) a non-toll call. If the call is a toll call (i.e., one of (i), (ii), or (iii)), then an appropriate indicator for the call-type is generated which can be provided to the AMN as will be described below. The determination of call-type is by well known analysis techniques, but it will be understood that digits are generally considered in order of entry until the call can be categorized as needed. Although 1+10D is in most cases, an inter-LATA call, that is not universally the case and an intra-LATA call may also be of that form, as well as in the 7-digits or 1+7 digit form. An international call is characterized by a leading 011.

At step 205, following the call-type determination, a test is made as to whether the call requires a toll carrier at all. That is, it may be that the call is not one of the triggering call-types (i.e., a toll call), but rather it is a local call for which no toll is required (e.g., category (iv) above). If no toll carrier is required, the process diverts to step 206 and the call is processed locally, being completed within the local exchange carrier network as a non-toll call.

On the other hand, if it is determined in step 205 that the call is not a local call, and is therefore a toll call—either intra-LATA, inter-LATA or international—then the SSP 104 determines at step 207 whether or not the calling station 100 (or the calling line 102) is pre-subscribed for a service, as implemented by the invention, whereby a carrier is to be automatically selected for the call from a plurality of available carriers. Notably, the service here described as being subscribed to in step 207 is to be contrasted with a service by which there is pre-subscription to a preferred carrier. Here, in step 207, the subscription being determined is whether or not the customer for calling station 100 has subscribed to a service by which there is automatic selection of a carrier that depends of the type of call being placed. That is, for example, there is a determination as to whether the customer is subscribed to a service that is capable of automatically picking a carrier whose identity depends, for example, on whether the call-type is intra-LATA toll, inter-LATA, or international. It should be further noted, however, that subscription to the service contemplates that the customer will select (or pre-subscribe to) a preferred carrier for each call-type.

The SSP 104 is programmed to identify those calling stations, such as station 100, (or alternatively the calling line, such as line 102) which are subscribed to the service. This is done in much the same manner that end-office switches are now operative to determine the appropriate carrier for a calling line under so-called "dial 1" equal access. Basically, the pre-subscription is identified by the SSP from the local loop line coding. By the current invention, a determination of subscription to the service in step 207 is one element of a selective trigger that causes SSP 104 to momentarily suspend its processing of the call being handled and turn to the advanced intelligent network (AIN) for information needed for routing the call to the appropriate carrier.

The invention also operates to automatically make a carrier selection for callers in another mode. Although pre-selecting carriers for various call-types is desirable in many instances, it is to be expected that subscribers will prefer on occasion to make their choices based on toll rates in preference to other considerations. It is a feature of the invention to alternatively select a carrier for a call as a function of toll rates; this is, in effect, a selection of least cost routing.

Thus, in step 207, even if it is determined that the calling station is pre subscribed to carrier selection based on call-type (i.e., a "yes" response at step 207), in one form of the invention, the caller may nevertheless be given an opportunity to override the subscription and request automatic selection of the lowest cost carrier based on the call-type and the destination of the call. The least cost routing option might be invoked, for example, by an entry, such as "*", "#", or a particular digit, from the calling station's DTMF key pad following entry of the dialed digits that identify the called station. Generally it will be desirable to allow this option to be operable and invokable without impeding or slowing down call processing. Thus, as a rule, it will be preferable to avoid announcements, as part of the call processing, that are for the purpose of letting a caller know that the option is available. Although announcements are not strictly precluded, it is preferable to simply rely on a caller's prior awareness that the option can be selected by appropriate entry (e.g., as mentioned above ). In one form of the invention, therefore, a monitoring test is included in the process, at step 209, to determine whether the caller has made such a request. This is best implemented in the SSP 104, which, as a result of its programming, monitors for entry of an appropriate request to invoke least cost routing, notwithstanding that there is a presubscription for carrier selection based on call-type. Such programming of any of the well known switches suitable for use as SSP 104 (discussed in the above-mentioned patent to Kay and McConnell) is a straightforward application of the switch.

Alternatively, however, if it is determined at step 207 that the calling station 100 is not pre-subscribed to the automatic selection service based on call-type, then step 211 follows to determine if the calling station 100 is pre-subscribed to a service providing automatic selection of a carrier based not only on the call-type, but also on least cost routing. This pre-subscription also may be determined from the line coding for calling station 100. That is, the customer for calling station 100 has the option of subscribing to a service wherein carrier selection is based strictly on call-type (step 207) or a call-type, but further including a least cost routing feature. In the former, the subscriber has the ability to elect the carriers from which the selection is made (discussed below); in the latter, the subscriber does not preselect carriers, but rather they are selected call-by-call on a least cost basis (at least in the preferred embodiment here being discussed). The determination for least cost pre-subscription at step 211 is also carried out in the SSP 104 in a manner similar to the determination conducted at step 207 discussed above.

If it is determined at step 211 that the calling station 100 is not pre-subscribed for least cost routing, the process is such that a caller at calling station 100 is still given an opportunity, as was discussed above in connection with step 209, to elect least cost routing on a per call basis (e.g., by entry of *1).

Thus, a test is made at step 213 to determine if such a request has been made. If there is no such request, and since it is conclusive at this point that there is no subscription to either of the services, step 214 is entered and the call will be conventionally handled by the SSP 104 without input from the AIN. An audible announcement may be provided to calling station 100 advising that a carrier must be selected or the call denied. For any of the tests, 209, 211, or 213, a determination that least cost routing is called for is also one element of a selective trigger that causes SSP 104 to momentarily suspend call processing and turn to the AIN for further call processing information in the manner mentioned above.

From the foregoing it will be noted that the process will, by this point, be set upon a path to provide either (1) automatic selection of a preferred carrier based on the type of call being handled, or (2) automatic selection of a carrier based on call-type, but also selected on the basis of least cost. In either case a determination has been made, based on information received at the end-office switch 104, that automatic selection of a carrier is requested for the call being handled.

For the case wherein carrier selection is to be handled strictly as a function of call-type, the process continues (following a "No" response at step 209) at step 219 (FIG. 2B). The SSP 104 will be triggered by the recognition of the pre-subscription (step 207) to suspend its processing of the call and to formulate a query message to be sent to the ISCP 126. The selective trigger acted upon by the SSP 104 results from the fact that (i) the calling station 100 has been recognized by the SSP 104 as subscribed to the service, and (ii) the call-type is identified as one of those from a set of call types requiring selection of a toll carrier.

The query message, formulated as outlined in the referenced Kay and McConnell patent, is forwarded from the SSP 104 via data links 122, 124 and STP 120 to the database SCP 132. The message forwarded, illustrated to occur at step 219, includes information on the dialed digits (usually the address digits of the called station), the identity of the calling station 100 (automatic number identification, or ANI), the class of service for the calling line (whether ISDN, data switched 56 kbs, video, etc.), and the identification of the call-type.

The database, SCP 132, contains a record for the calling station 100 that relates call-type to the subscriber's toll carrier of choice. The relationship may also be prescribed such that the selection of carrier further depends on the class of service, the day of the week, the time of day, and other such factors. The arrangement or relational tables and processing within the database 132 for that purpose is in accordance with techniques now well known in the art.

Acting on the query message, the database 132 produces the identity of a toll carrier selected to handle the call to the SSP 104. This step and subsequent processing following carrier identification are set forth in more detail below.

In a similar manner, should the process be on the path to provide least cost routing (i.e., the second case mentioned above), then step 223 follows from either of steps 211 or 213 and a least cost routing indicator is generated for inclusion in the query message that is to be sent to the ISCP 126. Thus, based on the call-type and the request for least cost routing service, the SSP 104 will also in the case of least cost routing be triggered to suspend processing of the call and formulate a query message to be sent to the ISCP 126. In this case, however, for giving direction to the ISCP 126, the least cost routing indicator, generated at step 223 by the SSP 104, will be included in the message. The message, formulated and forwarded to the database at step 225, also includes the dialed digits, and information to identify the calling station and the call-type.

At this point, for steps 202–225, the process has taken place in the SSP 104. With the processing of the call momentarily suspended at the SSP 104, the next steps are carried out within the ISCP 126 until such time as it returns a response message to the SSP 104 with an indication of a toll carrier selected for the call.

Within the ISCP 126, at step 227, it is first determined whether the processing is to be for selection of a carrier determined by call-type or determined by call-type with least cost routing. For this determination, the ISCP 126 looks for the presence of a least cost routing indicator in the received query message. If the indicator is detected, then the process diverts to step 229 for a least cost routing routine that is performed in the ISCP 126. If the indicator is not sent, the process continues from step 227 to step 231 whereby, in lieu of the least cost routing procedure, a database file for the calling station 100 is accessed.

Pursuing first a description of the steps following step 231 (for routing based on call-type), once the file for calling station 100 is accessed, a determination is made in step 233 as to whether carrier selection also depends on subclassifications such as class of service (e.g., data, video, switched 56 kbs, etc.),time of day, area code, called party telephone number, and so forth. If not, then in process step 235 the database 132 performs a look up in the subscriber file to identify a toll carrier for the call type (potentially one carrier if intra-LATA toll call, another if inter-LATA, and perhaps another if international). If there are subclassifications to the call-type—class of service routing, for example—then process step 237 is performed, rather than step 235, whereby not only is the call-type considered, but these other factors are also considered when identifying a toll carrier for the call.

In either case, whether by step 235 or by 237, the ISCP 126 will make a final determination in step 239 (FIG. 2C) as to whether the subscriber for calling station 100 (or, more particularly, the calling station itself) is acceptable to the identified carrier. It might be, for example, that the subscriber associated with the calling station 100 is in paying the carrier's prior charges for services and the carrier is therefore denying calling privileges to the calling station. For this purpose the database file for the calling station 100 may be arranged in any number of ways, and may, for example, contain an indicator for each carrier (which is updated frequently) to indicate whether calls from the calling station can be accepted or not. This is discussed further herein below. If a call is not acceptable to the identified carrier then the process diverts to step 240 whereby the SSP 104 will be advised, via the ISCP response message, that the call will not be accepted by the identified carrier and the call will be denied. This procedure may include an to the caller that the call cannot be accepted. These and other similar conventional steps are taken in FIG. 2 to be accomplished in step 240.

If the carrier is willing to accept the call, however, as determined in step 239, a response message is formulated by the ISCP 126, through operation of database 132, which includes the identity of the determined toll carrier. That message is returned in step 241 to the SSP 104. The routing for the response message is back through the STP 120 via data links 122 and 124. Upon receipt of the identity of a pre-subscribed toll carrier, the SSP 104 resumes processing of the call and in step 243 connects the call to the identified carrier. Should the call be intra-LATA toll and to call station 108, for example, the route selected might be through access tandem 116 and end-office 118. Alternatively, depending on subscriber pre-selection, the route could be through POP-1, carrier switch 110, IXC network 112, trunking system 140 (inter-connecting IXC network 112 and end-office 118), and end-office 118. Similarly, routing could be through any of the available networks of any of the carriers.

By comparison, an inter-LATA or international call would, of necessity, require placement with one of the long distance carriers having a point-of-presence (as, for example, POP-1 through POP-N) accessible to the SSP 104.

For determination of a carrier based on toll rates (i.e., least cost routing), to be taken up at step 229 of the process, the database 132 of the ISCP 126 includes rate tables for the various toll carriers according to call-type and from which the toll charges for a call can be determined as a function of the local exchanges between which the call is to be connected. There is no need in the least cost routing aspect of the invention for access to a file particular to the calling station. In step 229, from the information indicative of call-type and from the addresses of the calling and called stations, the ISCP 126 looks up in database 132 the carrier that has the lowest toll rate. This requires a comparison of rates which is carried out within the ISCP 126 in any of the many known ways for comparison or establishing an ordered hierarchy of rates. In the event there is equality of lowest rates between two or more carriers, one or the other may be randomly selected. It is within the scope of the invention, however, that for pre-subscribed lowest cost routing, a subscriber may pre-select preferred carriers who are default to in the event of equal rates.

It will be recognized at this point that, for least cost routing, and for carrier control over those calls (such as was discussed above in connection with step 239 whereby a call is determined to be acceptable or unacceptable to a carrier) considerable amounts of data are required from each carrier for inclusion in the ISCP 126. For that purpose, the ISCP 126 may be interconnected to the data networks of those other carriers for direct data transfers; i.e., which data from another network may be directly deposited and updated in the ISCP 126. The means for this is illustrated in FIG. 1 showing, for example, a data link 144 connecting ISCP 126 via an STP 146 into the data network of another carrier. These kinds of signalling connections (e.g., as by out-of-band signalling networks) are currently in place in a number of instances and the techniques for implementing them are now well known.

It will also be recognized that data may be entered into the database through SCE 134, and it is principally by the SCE 134 that subscriber data for pre-selected carriers, for time of day preferences, and for other such routing criteria are entered. This means of data entry lends significant advantage to the invention since carrier selections and other changes can be made considerably faster and easier into the data base 132 than into the end-office switch.

Thus, following step 229, and once a carrier is identified for the least cost feature, a check is made in step 245 to see if the call will be accepted-by-the selected carrier. This is similar to the test made at step 239. Should there be an indication that the call will not be accepted, the process checks at step 247, to see if an alternate carrier is available. If so, then a look-up is again performed (in ISCP 126) at step 249 to determine the next lowest cost carrier. Following that the process returns to step 245 wherein a call acceptance test is made for the alternatively selected carrier. The loop through step 245, 247 and 249 is repeated until either the list of all available carriers is exhausted in step 247 or a carrier is found that will accept the call. If none will accept the call, the process diverts to step 250 and the call will be handled as described above for processing step 240.

If, on the other hand, the call is accepted by a carrier as determined in step 245, the ISCP 126 is prepared to formulate a message to go back to the SSP 104 advising it of the selected carrier's identity. For that, the process may progress directly to step 241 whereby, as mentioned above, the response message with the carrier identification is returned to the SSP 104. This is indicated in FIGS. 2B and 2C by the dashed line joining blocks 245 and 241.

At this point in the process, however, optional steps may be included to give the caller an opportunity to decline the use of the selected carrier. Steps 251, 253, 255 and 257 are included to implement this feature of the invention. First, in step 251, the identity of the selected carrier is passed back to the SSP 104 along with a bit in the response message to indicate to the SSP 104 that an announcement is to be given on the calling station line. Based on that, the SSP 104 (step 253, FIG. 2C) causes an announcement to be given to the calling station 100 advising of the identity of the selected carrier and asking for an input indicative of whether the caller wishes to accept the selected carrier for use in carrying the call or wishes another selection to be made. The indication for either acceptable or alternative selection might, for example, be given via the station's DTMF inputs (e.g., "1" for acceptance, "2" for selection of another carrier) or by use of voice recognition. If the selected carrier is not acceptable to the caller, as determined by step 255, another query is formulated and sent to the ISCP 126 at step 257 and the database process is re-entered at step 247 to determine if other carriers are available. The process recycles through steps 247–255 and 245 until either an acceptable carrier is found or the call is denied.

At step 255 once a carrier is indicated by the caller to be acceptable, step 243 is taken up whereby the SSP 104 resumes its processing of the call and connects it to the selected carrier.

The foregoing describes a preferred form of the invention. It will be apparent to those of skill in the art, however, that the invention may take various forms and that various modifications may be made therein. Accordingly, it is intended by the following claims to claim all modifications which fall within the true spirit and scope of the invention.

The invention claimed is:

1. A method for automatically selecting a toll carrier for an intra-LATA toll call and a toll carrier for an inter-LATA call from a plurality of toll carriers to carry a toll call received at a telecommunications switch from a calling station, so that each call is carried at a lowest available toll rate, comprising the steps of:

(a) confirming that the call is a toll call and determining from information received with the call and from a set of toll call-types, if the call-type for the toll call is an intra-LATA toll call or an inter-LATA call;

(b) formulating a query message containing information indicative of the call-type determined in step (a), of an address for the calling station, and of dialed address digits received from the calling station;

(c) forwarding the query message to a database separate from the telecommunications switch, said database containing toll rates for intra-LATA toll calls and inter-LATA calls for each carrier of the plurality of carriers, and determining from the address of the calling station and from the dialed address digits, the toll carrier having the lowest toll rates for each intra-LATA toll call and the Loll carrier having the lowest toll rates for each inter-LATA call; and (d) causing the telecommunications switch to connect the call to the determined carrier.

2. The method of claim 1 wherein the toll call-type is determined from dialed digits received from the calling station.

3. The method of claim 2 wherein prior to connection of the call to the determined carrier it is further determined whether the call is acceptable to the carrier and then connecting the call to the carrier only if it is acceptable.

4. The method of claim 3 wherein prior to connection of the call to the determined carrier it is further determined whether the determined carrier is acceptable to a caller placing the call from the calling station and then connecting the call to the carrier only if said carrier is acceptable.

5. A method for selecting a carrier network from a plurality of carrier networks to carry an in intra-LATA toll call received at a telecommunications switch from a calling station, comprising the steps of:

(a) from information received from the calling station as part of the call and from a plurality of call-types, determining if a call is an intra-LATA toll call;

(b) if the call is an intra-LATA toll call, accessing a database separate from the telecommunications switch having content associating a plurality of carrier networks with intra-LATA toll calls, and determining from said content the carrier network associated with the intra-LATA toll call from the calling station; and (c) directing the telecommunications switch to connect the intra-LATA toll call to the carrier network determined in step (b)

wherein the carrier network for intra-LATA toll calls has been pre-selected from a plurality of intra-LATA toll carrier networks by a subscriber for the calling station.

6. A system for automatically selecting a carrier for an intra-LATA Loll call, and an inter-LATA call originating from a subscriber line, comprising:

switching means for receiving each call, said switching means being adapted to process the call until a selective trigger indicative that the call is a toll call is detected and to thereupon suspend processing of the call and determine whether the toll call-type is an intra-LATA toll call or an inter-LATA call; and a database separate from and accessible by the switching means while processing for the call is suspended, said database being adapted to receive from the switching means an identification of the subscriber line and of the determined call-type to identify at least a carrier assigned to intra LATA toll calls and a carrier assigned to inter-LATA calls for the subscriber line and to provide the switching means with the identity of the assigned carrier;

wherein said switching means is further adapted to resume processing for the call upon receipt of the identity of the assigned carrier so as to connect the call to the assigned carrier, and wherein each carrier assigned to intra-LATA toll calls and each carrier assigned to inter-LATA calls has been pre-selected by the subscriber for the subscriber line.

7. The system of claim 6 wherein the indication that the call is a toll call and the determination of toll call-type are obtained from inputs received from the subscriber line.

8. The system of claim 7 wherein the switching means is further adapted to suspend call processing only if the selective trigger is additionally indicative that the subscriber line is presubscribed for automatic selection of a carrier.

9. The system of claim 8 further including service creation means interconnected to the database whereby the identify of the carrier assigned to the call-type for the subscriber line may be altered.

10. The system of claim 9 wherein the switching means is located in an end-office of a telephone network and access to the database is via a signaling connection.

11. A method for automatically selecting a toll carrier for an intra-LATA toll call and an inter-LATA toll call to carry a toll call received at an end office switch, comprising the steps of:

determining if a call received at and end office switch is a toll call;

if the call is a toll call, then determining if it is an intra-LATA call or an inter-LATA call, and if the caller is a subscriber to a pre-subscription service of toll carriers;

if the call is an intra-LATA call and the caller is a subscriber to said service, accessing the subscriber's record in a database separate from the switch to identify a first selected one of an available plurality of carriers and routing the all via the first selected carrier;

if the call is an inter-LATA call and if the caller is a subscriber to said service, then accessing the calling party's record in said database to identify a second selected one of available plurality of carriers and routing the call via the second selected carrier.

* * * * *